United States Patent [19]

Schumacher et al.

[11] Patent Number: 5,091,131
[45] Date of Patent: Feb. 25, 1992

[54] METHOD OF ATTACHING SMALL PLASTIC PARTS SECURELY ON COMPRESSION MOLDED PARTS

[75] Inventors: Rolf Schumacher, Sindelfingen; Ewald Eissler, Hildrizhausen, both of Fed. Rep. of Germany

[73] Assignee: Mercedes-Benz AG, Fed. Rep. of Germany

[21] Appl. No.: 584,922

[22] Filed: Sep. 18, 1990

[30] Foreign Application Priority Data

Oct. 6, 1989 [DE] Fed. Rep. of Germany ....... 3933416

[51] Int. Cl.⁵ ...................... B29C 43/02; B29C 45/14
[52] U.S. Cl. .................................. 264/112; 264/118; 264/266; 264/273
[58] Field of Search ............... 264/109, 112, 118, 119, 264/257, 259, 250, 266, 273

[56] References Cited

U.S. PATENT DOCUMENTS

| | | | |
|---|---|---|---|
| 3,408,438 | 10/1968 | Staunton | 264/273 |
| 3,661,688 | 5/1972 | Wheeler | 264/119 |
| 3,890,679 | 6/1975 | Simon | 264/273 |
| 4,088,729 | 5/1978 | Sherman | 264/259 |
| 4,293,313 | 10/1981 | Duckstein | 264/273 |
| 4,409,163 | 10/1983 | Van Manen | 264/45.5 |
| 4,705,469 | 11/1987 | Liebl et al. | 425/117 |

FOREIGN PATENT DOCUMENTS 1023886  3/1966  United Kingdom ................ 264/273

*Primary Examiner*—Mary Lynn Theisen
*Attorney, Agent, or Firm*—Evenson, Wands, Edwards, Lenahan & McKeown

[57] ABSTRACT

A method attaches small plastic parts securely in a defined position on compression molded parts consisting substantially of bonded or synthetic resin bound natural fibers or chips. The parts are compression molded into the desired shape in a compression mold from a preformed, loose layer of a mixture of at least one of natural fibers and chips and of binder introduced into the compression mold, while undergoing a setting reaction of the binder and a volume reduction of the layer. During the compression molding operation, at least one clearance or thin portion, smaller than the small plastic part, is formed in the wall of the compression molded part at the fastening point of the small plastic part on the compression molded part. Thereafter, a direct form-fitting injection molding of the small plastic part or parts onto the wall of the compression molded part at the fastening point is carried out. The finished compression molded part is placed in a defined position with the fastening point in a split injection mold for molding on the small plastic part, each mold half of the injection mold coming snugly into contact on the near side and the far side of the wall of the compression molded part. The plastic for forming the small plastic part is injected from one side of a mold half into the injection mold and, within the injection mold, completely fills the clearance of the compression molded part. The plastic reaches the mold half opposite the injection side through the clearance or the thin portion which breaks open under the pressure of the plastic injected therein.

3 Claims, 2 Drawing Sheets

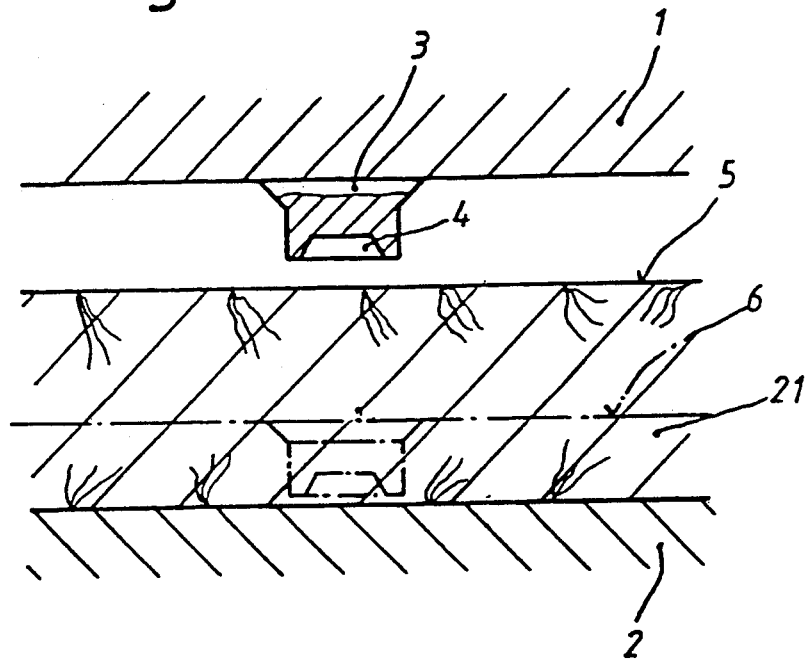
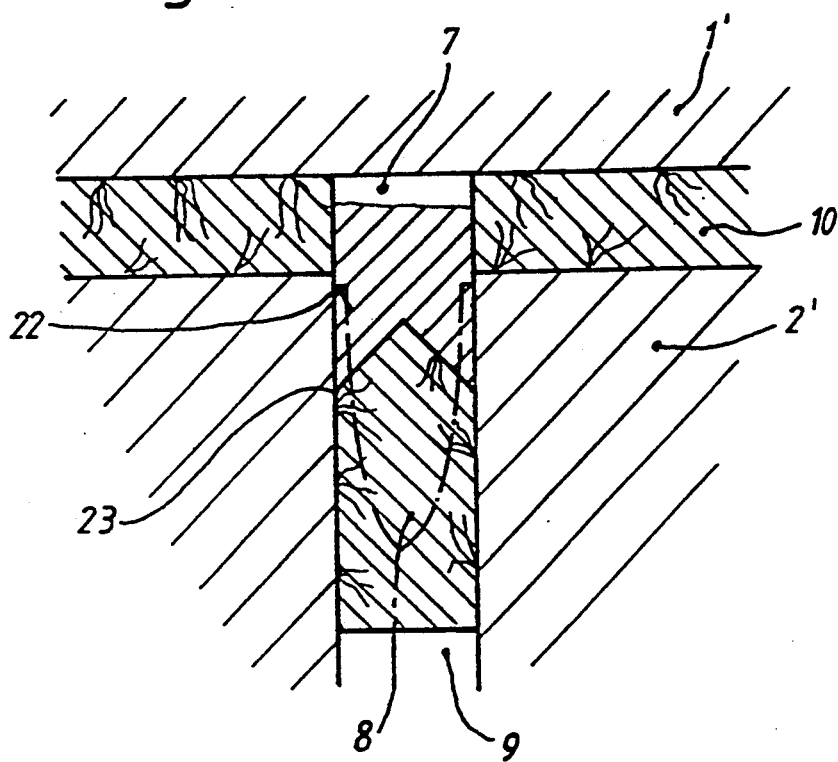

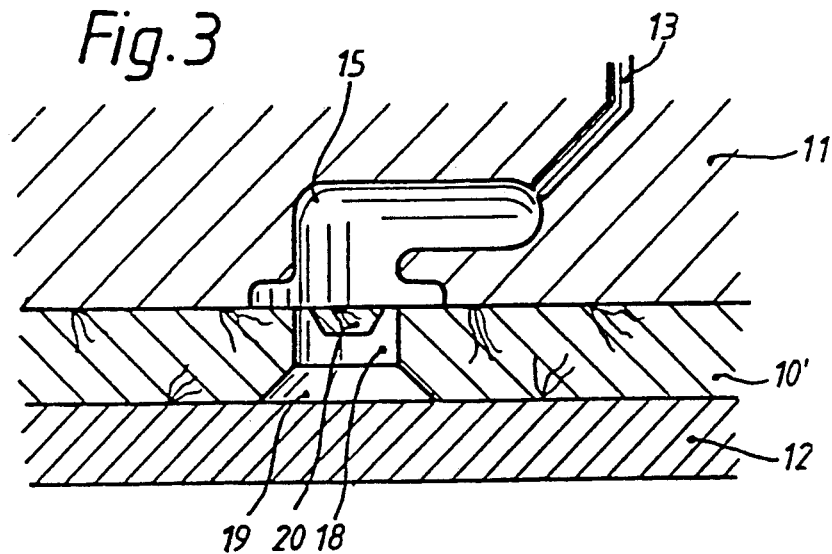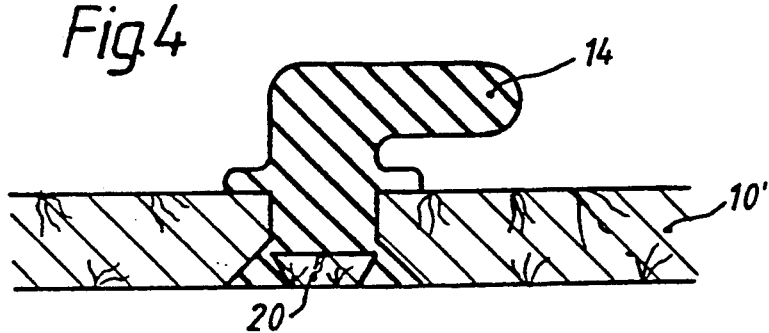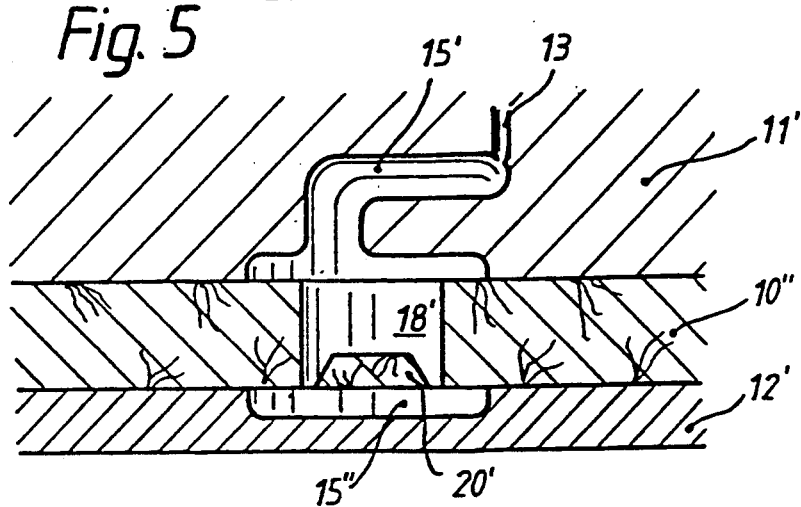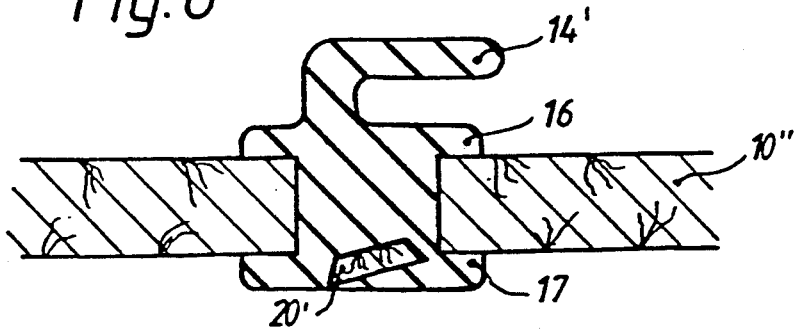

METHOD OF ATTACHING SMALL PLASTIC PARTS SECURELY ON COMPRESSION MOLDED PARTS

BACKGROUND AND SUMMARY OF THE INVENTION

The present invention relates to a method of attaching small plastic parts securely in a defined position on compression molded parts consisting substantially of bonded or synthetic resin-bound natural fibers or chips, as used in the production of panelling elements.

Panelling parts, in particular those parts having a reinforcing and bearing function, are produced, among other ways as compression molded parts from compressed fiber composite, such as for example pressboard panels. The fiber composites are inexpensive and relatively lightweight, which is especially advantageous in automobile construction. After compression molding, small plastic parts, for example in the form of fastening elements, are attached to the compression molded parts. Since they must have better moldability and greater stability than the compression molded part, these fastening elements are made from a different material and more expensive than the fiber composite.

The fastening elements are attached by adhesive bodding, riveting, clenching, ultrasonic welding or else by friction welding. However, all of these methods involve costly machine technology. In addition, adhesive bonding strength is temperature-dependent and also costly due to the adhesive additionally required. Another technique for attaching the fastening element is by locking the fastening elements on to metal clips which are placed into the compression mold during the compression molding of the compression molded part. This technique has the disadvantage, however, not only of the additional material expenditure but also of the intervention necessary for this in the compression molding cycle.

An object of the present invention is to utilize a method by which small plastic parts can be attached simply and inexpensively to the compression molded part.

That object has been achieved according to the present invention by a direct, form-fitting injection molding of the small plastic part onto the wall of the compression molded part. In a method according to the present invention, after compression molding of the compression molded part, the small plastic parts are molded in place and fastened to the compression molded part in a single working step by an injection molding process. Since the injection molded plastic is used both for fastening and for the plastic parts themselves, there is not only the advantage in terms of time and costs from saving at least one working step, but also the cost advantage from saving the previously required auxiliary materials and substances such as screws, clips or adhesive. Under certain circumstances, less expensive plastics than previously can also be used.

BRIEF DESCRIPTION OF THE DRAWINGS

These and other objects, features and advantages of the present invention will become more apparent from the following detailed description of a number of exemplary embodiments by which the method in accordance with the present invention can be carried out when taken in conjunction with the accompanying drawings wherein:

FIG. 1 is a cross-sectional schematic view of a compression mold which shows the beginning of the compression molding operation of a compression molded part having a clearance closed by a cover;

FIG. 2 is a view similar in type to FIG. 1 but shows the end of the compression molding operation of a further compression molded part having a complete clearance;

FIG. 3 is a view similar in type to FIG. 1 but shows the beginning of the injection molding operation of an undercut clearance;

FIG. 4 is a cross-sectional view which shows the finished and fastened small plastic part produced according to the method directed in FIG. 3;

FIG. 5 is a view similar in type to FIG. 3 but shows the beginning of the injection molding operation of a complete clearance; and FIG. 6 is a cross-sectional view which shows the finished and fastened small plastic part produced according to the method depicted in FIG. 5.

DETAILED DESCRIPTION OF THE DRAWINGS

In FIG. 1, the initiation of a compression molding operation for a compression molded part 10' is represented diagrammatically. The compression mold consists of a top mold force 1 and a bottom mold force 2, and is open. A fiber composite 21, e.g., natural fibers and/or chips mixed with adhesive or synthetic resin, is placed between the top mold force 1 and the bottom mold force 2. The filled height 5 of the loose fiber composite 21 is greater than the subsequent final dimension shown by the dot-dash line 6 of the compression molded part 10' which is compression-molded from the loose composite 21, A forming die 3 is on the top mold force 1 and has, on its end face, a depression 4 facing towards the fiber composite 21. Starting from the top mold force 1, the forming die 3 initially tapers conically and is then of a cylindrical shape.

During compression molding of the compression molded part 10', the top mold force 1 is moved towards the bottom mold force 2 under pressure. By doing so, the forming die 3 penetrates into the composite 21 to be compression molded, as a result of which are formed, as shown in phantom lines in FIG. 1 and in full lines in FIG. 3, a clearance 18 and, on the side facing the bottom mold force 2, a cover 20 closing this clearance 18. The cover 20 is joined to the finished compression molded part by a notch-like thin portion, following a continuous line. This thin portion is formed by the rim of the end face of the forming die 3 surrounding the depression 4, since the extent of the forming die 3 transversely on the surface of the compression molded part 10' is slightly smaller than the final dimension 6. The conical part of the forming die 3 forms on the opposite wall of the compression molded part 10' and undercut 19 of the clearance 18. Once the compression molded part 10' has cured, it is placed in an injection mold as shown in FIG. 3.

A further and easier technique for providing clearances when compression molding a part 10 is shown in FIG. 2. One difference of this compression molded part 10 in comparison with that of the part 10' of the first example shown in FIG. 1 is that in the part 10 the clearance is open on both sides and is also without an undercut 19. A bore 9, which is adapted to the diameter of the clearance, is located on the bottom mold force 2', at the position of fastening point of a small plastic part to be later attached. During the compression molding operation, a punching die 7 or a piercing pin 8 (shown in dot-dashed lines), arranged on the top mold force 1', penetrates into the bore 9. The punching die 7 or the piercing pin 8 has an axial length along the axis of the clearance which exceeds the final dimension of this compression molded part for the purpose of removing only the excess fiber composite in the region of the clearance via the bore 9 during the compression molding operation. As a result, the density of the fiber composite in the region of the borders of this clearance is virtually the same as the density elsewhere in the compression molded part 10.

In order that any protruding natural fibers or chips around the borders of this clearance to do not have any blocking effects during the compression molding operation, the punching die 7 has a cutting edge 23 on its end face and the piercing pin 8 has an edge 22 which shears off these fiber parts. The edge 22 of the piercing pin 8 widens the piercing pin 8 to the diameter corresponding to the bore 9 and is arranged at a distance from the top mold force 1' which is slightly greater than the final dimension of this compression molded part 10. The further step of the method corresponds to that of the example previously described and is therefore not described any further. However, this technique of making clearances is only used very rarely in practice, since the removal from the hold mold of the punching scrap produced presents some problems. Until now, clearances of this type have been made in practice in a separate operation following the production of the molded part.

As can be seen in FIG. 3, the previously described example of the finished compression molded part 10' shown in FIG. 1 is placed in a defined position in an injection mold formed of an upper mold half 11 and lower mold half 12. On the wall side of the undercut 19, the compression mold part 10' lies flush and snugly on the lower mold half 12. On the other wall side, the upper mold half 11 has an injection mold 15 forming a small plastic part 14 (FIG. 4) and in injection runner 13 for the liquid plastic incorporated therein above the region of the clearance 18 and is likewise snugly placed in position relative the molded part 10'. The plastic is subsequently introduced through the injection runner 13 under pressure and completely fills the injection mold 15 forming the small plastic part 14. The thin portion breaks open and, with the free volume of the clearance 18 with its undercut 19 being filled completely, forces the cover 20 away in the direction of the lower mold half 12 into the undercut 19. Once the plastic has cured, the injection mold is released.

The small plastic part 14, in this case a fastening element formed in the above-described manner is shown in FIG. 4. With the fastening element, the compression molded part 10' can be fastened adjacent another component. The side of the undercut 19 is filled with the plastic flush with the wall of the compression molded part 10, and the forced-away cover 20 avoids sink marks in the plastic in this region which otherwise can occur during the curing of the plastic. In addition this filling saves plastic.

A further small plastic part 14' is shown in FIG. 6 and the associated injection molding operating is shown in FIG. 5. The differences in this case from the previous example are that the small plastic part 14' on the walls of the molded part 10" has an upper covering 16 and a lower covering 17, the respective surfaces of which have a greater cross-sectional area than the cross-section of the associated clearance 18'. The injection molds 15', 15" for the small plastic part 14' are in this case incorporated in the lower mold half 12' (injection mold 15") and in the upper mold half 11' (injection mold 15'). The injection molding operation of the example described with reference to FIGS. 3 and 4 can in principle be applied to this situation as well, but here the cover 20', which is attached to the lower wall of the compression molded part 10' in order to reduce the displacement work of the plastic flowing in through the injection runner 13', is forced away into the lower covering 17 which is formed by the injection mold 15".

In order to open thin portions and/or covers joined thereby, for which the pressure required to penetrate them is very high, it is appropriate to arrange above the location of the intended clearance a push rod which is arranged axially movably in the upper mold half. At the beginning of the injection molding operation, the cover or the thin portion is then pushed out, the push rod is retracted in such a way that only negligible traces or no traces at all can be seen in the cured small plastic part, with the injection molds and the clearance being filled completely during the injection molding operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A method of attaching at least one small plastic part securely in a defined position in relation to a compression molded parts consisting substantially of at least one of resin bound natural fibers and chips and also of binder, comprising the steps of introducing a loose layer of a mixture of at least one natural fibers and chips and binder into a compression mold, compression molding the mixture into a desired shape by undergoing a setting reaction of the binder and a volume reduction of the layer while forming at least one thin portion, smaller than the plastic part, in a wall of the compression molded part at a fastening point of the plastic part on the compression molded part;

placing the finished compression molded part in a defined position with the fastening point in a split injection mold for molding the small plastic part in relation to the compression molded part, each half of the injection mold being brought snugly into contact on a near side and a far side of the wall of the compression molded part; and a direct, form-fitting injection molding of the small plastic part, in relation to the wall of the compression molded part at the fastening point by injecting plastic for forming the small plastic part from one side of a mold half into the injection mold and, within the injection mold the thin portion breaking open under the pressure of the injected plastic and leaving a clearance at the fastening point, so as to completely fill the clearance of the compression molded part, the plastic reaching the mold half opposite the one side through the clearance.

2. The method according to claim 1, wherein the thin portion has a notch-like cross-sectional shape and follows a continuous line such that during the injection molding step, a cover filling at least the clearance is broken out from the wall of the compression molded part and pushed into the mold half opposite the one side so as to be at least partially surrounded with injected plastic.

3. The method according to claim 1, wherein the step of compression molding includes forming a cover joined to the compression molded part to close the clearance of the compression molded part, the plastic forming the small plastic part being injected in from the wall side of the compression molded part opposite an undercut of the clearance, and the cover being forced away towards a side of the undercut.

* * * * *